United States Patent
Stahl et al.

(10) Patent No.: US 7,901,119 B2
(45) Date of Patent: Mar. 8, 2011

(54) VEHICLE

(75) Inventors: Hans-Ulrich Stahl, Munich (DE); Alexander Kron, Munich (DE); Thoralf Maier, Germering (DE); Dietrich Sturm, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/470,101

(22) Filed: May 21, 2009

(65) Prior Publication Data

US 2010/0014307 A1 Jan. 21, 2010

Related U.S. Application Data

(63) Continuation of application No. PCT/EP2007/008639, filed on Oct. 5, 2007.

(30) Foreign Application Priority Data

Nov. 22, 2006 (DE) .......... 10 2006 054 917

(51) Int. Cl.
*B60Q 1/26* (2006.01)
*B60Q 1/00* (2006.01)
*F21V 9/14* (2006.01)

(52) U.S. Cl. ............ 362/494; 362/19; 362/459; 362/542

(58) Field of Classification Search .................. 362/494, 362/540, 542, 459, 19; 359/601
See application file for complete search history.

(56) References Cited

U.S. PATENT DOCUMENTS

| | | | | |
|---|---|---|---|---|
| 2,200,300 A | * | 5/1940 | Roper | 362/19 |
| 2,457,348 A | * | 12/1948 | Chambers | 362/540 |
| 4,351,557 A | | 9/1982 | Chary | |
| 4,418,377 A | | 11/1983 | Tamura | |
| 4,475,100 A | * | 10/1984 | Duh | 362/494 |
| 6,502,970 B1 | * | 1/2003 | Anderson et al. | 362/494 |
| 2005/0231970 A1 | * | 10/2005 | Kagawa | 362/494 |
| 2005/0270789 A1 | | 12/2005 | Lueftner | |

FOREIGN PATENT DOCUMENTS

| | | |
|---|---|---|
| DE | 23 53 485 A1 | 5/1975 |
| DE | 30 35 282 C2 | 4/1981 |
| DE | 43 30 708 A1 | 3/1995 |
| DE | 43 40 708 A1 | 6/1995 |
| DE | 44 25 840 A1 | 1/1996 |
| DE | 101 37 249 A1 | 2/2003 |
| DE | 20 2004 008 856 U1 | 9/2004 |
| EP | 1 602 531 A2 | 12/2005 |

OTHER PUBLICATIONS

International Search Report dated Feb. 4, 2008 with English translation (four (4) pages).
German Search Report dated Jun. 20, 2007 with English translation (nine (9) pages).

* cited by examiner

*Primary Examiner* — Stephen F Husar
*Assistant Examiner* — James W Cranson
(74) *Attorney, Agent, or Firm* — Crowell & Moring LLP

(57) ABSTRACT

A vehicle has a lamp arranged outside a passenger compartment having a vehicle window through which light of the lamp penetrates into the vehicle. The lamp is arranged and constructed such that the light of the lamp is or will be polarized parallel to a plane of incidence of the light.

19 Claims, 3 Drawing Sheets

VEHICLE

CROSS-REFERENCE TO RELATED APPLICATIONS

This application is a continuation of PCT International Application No. PCT/EP2007/008639, filed Oct. 5, 2007, which claims priority under 35 U.S.C. §119 to German Patent Application No. DE 10 2006 054 917.1, filed Nov. 22, 2006, the entire disclosures of which are herein expressly incorporated by reference.

BACKGROUND AND SUMMARY OF THE INVENTION

The invention relates to a vehicle comprising a lamp arranged outside the passenger compartment.

The very rapid technological development in the field of driver assistance systems is currently leading to the development and availability of lane change assistance systems. In such systems, information or warnings are signaled to the driver, for example, by means of light devices which are arranged in the area of the outside mirror.

Before it reaches the driver's eye, the light emitted by such a light device will impinge on a vehicle window (for example, the side window of the vehicle). Depending on the angle of incidence, one portion of the light will be reflected by this side window and another portion of the light will be transmitted. First, the reflected portion will have a disturbing effect on other traffic participants and, second, will not be available for signaling to the driver.

From German patent document DE 43 30 708 A1, an optical safety system using light polarizers to avoid a blinding effect by way of the vehicle headlights is known, in which case portions of the light polarizers are connected in front of light sources and other portions of the light polarizers are applied either in front of, in, or behind transparent materials (such as glass, mirrors, etc.). The intensity of the light penetrating through the light polarizers is controlled by a variable or fixed crossing of the planes of polarization of the different above-mentioned light polarizers. The blinding effect caused by the lights of the various vehicles and street lights or their reflections will be varied or completely prevented by this crossing of the above-mentioned polarizers.

An object of the present invention is to effectively signal information to the driver of a vehicle by a light device arranged outside of the passenger compartment.

This object is achieved by a vehicle having a lamp arranged outside a passenger compartment. Light of the lamp penetrates into the vehicle through a vehicle window. The lamp is arranged and constructed such that the light of the lamp is or will be polarized parallel to a plane of incidence of the light. Advantageous further developments of the invention are described herein the dependent claims.

The invention is therefore based on arranging and constructing the light device such that light of the light device is or will be polarized essentially parallel to a plane of incidence of the light.

The vehicle preferably includes a lamp arranged outside the passenger compartment and a vehicle window through which the light of the lamp penetrates into the vehicle, the lamp being arranged and constructed such that the light of the lamp is or will be polarized essentially parallel to a plane of incidence of the light. Particularly preferably, the lamp includes a polarization device (or a polarization device is assigned to the lamp), which polarization device is arranged and constructed such that light of the lamp is or will be polarized essentially parallel to a plane of incidence of the light.

As a result, it is achieved that the portion of the light reflected by the vehicle window is reduced, particularly minimized, and the portion of the light transmitted through the vehicle window is increased, particularly maximized. This is a result of the so-called Fresnel formulas. It is thereby achieved that disturbances of other traffic participants caused by reflected light are reduced, whereas the driver can more easily notice the transmitted light.

The lamp or the light device may include a light source, such as a light-emitting diode, and/or a reflector. Within the scope of the invention, the term "lamp" also includes active or passive display lights or light displays, such as an LCD or an OLED display. The lamp may also be integrated in a mirror or shine behind a mirror. The polarization device is preferably connected behind the light source, but may be an integral part of the lamp or of the light device. Likewise, based on its principle, the lamp, the light device or the light source may generate already linearly polarized light and, in particular, may be constructed without a polarization device provided especially for this purpose.

The vehicle preferably includes an outside mirror, a lamp carried by the outside mirror and a side window through which light of the lamp penetrates into the vehicle. The light of the lamp is or will be polarized essentially parallel to the plane of incidence of the light.

The plane of incidence is preferably defined by a normal vector with respect to the vehicle window, particularly the side window, in a point of incidence of the light on the vehicle window, particularly the side window, and the direction of incidence of the light. Particularly preferably, a desired direction of incidence (or desired direction of propagation) of the light is defined, the plane of incidence being defined by the normal vector of the vehicle window, particularly the side window, in the point of intersection between the desired direction of incidence with the vehicle window, particularly the side window, and the desired direction of incidence of the light. When, in addition, the lamp is constructed such that light is preferably emitted by the lamp—for example, more than 30%, 50% or 70% of the light flux generated by the lamp—essentially in the direction of the desired direction of incidence, the portion of the light originating from the lamp and reflected by the vehicle window, particularly the side window, can be reduced particularly effectively.

The desired direction of incidence preferably is aimed from the lamp in the direction of the 95% eye ellipse in order to make it possible for the driver to easily notice the signals originating from the lamp.

According to a preferred embodiment, the lamp is equipped such that it emits turn signal light at least temporarily.

The lamp is preferably equipped for signaling an object or a danger in the surroundings of the vehicle.

Other objects, advantages and novel features of the present invention will become apparent from the following detailed description of one or more preferred embodiments when considered in conjunction with the accompanying drawings.

DETAILED DESCRIPTION OF THE DRAWING

Figure 1:
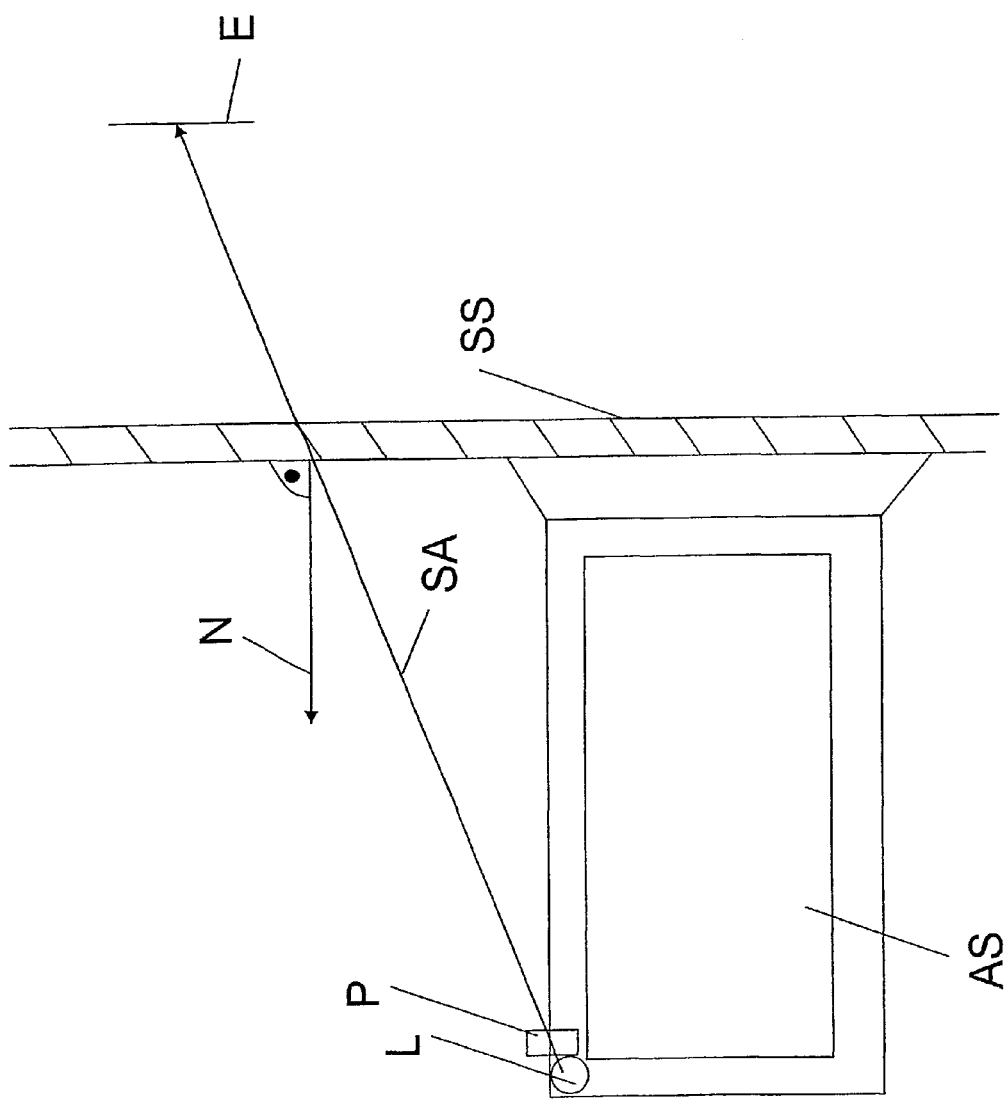
FIG. 1 is a simplified schematic sectional representation of a part of a vehicle.

FIG. 1 contains a sectional view of a side window SS of a vehicle. Outside the side window SS, an outside mirror AS is illustrated, which mirror carries a signal lamp L. Inside the side window SS, a section through a 95% eye ellipse E is shown. The eye ellipse according to SAE J941 represents an aid for the construction of lines of sight while taking into account the distribution of the eye positions in the vehicle. In this case, it characterizes the distribution of the eye positions in a certain plane of the vehicle (usually a plane parallel to the ZERO-Y or ZERO-Z plane of the vehicle coordinate system). The position of the ellipse is determined by the size and slope of its principal axes as well as the position of its center point with respect to its seating reference point, the x and z coordinates varying as a function of the backrest tilt. Mathematically, the eye ellipse represents the contour of the same frequency density in a two-dimensional normal statistical distribution. Pragmatically, the eye ellipse is created in that straight lines are drawn in an arbitrary direction in a two-dimensional distribution of eye point positions, which were determined by tests. These straight lines are placed such that the measured eye positions always have the same ratio; i.e. always the same percentage of eye points—here, 95%—are situated on one side of the straight line, and the remaining 5% are therefore situated on the other side of the straight line. The envelope of all these straight lines will then be an ellipse (here, the so-called 95% eye ellipse because 95% of all eye point positions are situated on the side of the straight line facing the ellipse).

Figure 2:
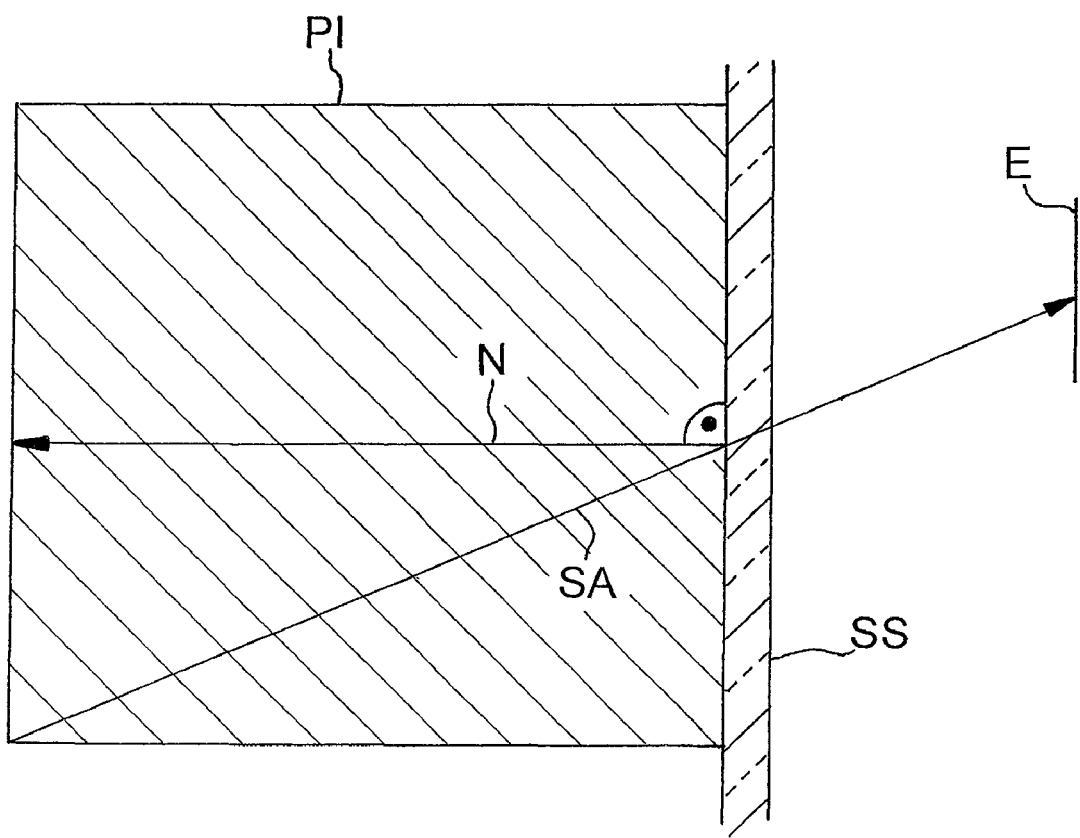
FIG. 2 illustrates a plane of incidence defined by a normal vector of a side window and a direction of incidence of light from a lamp.

The light of the lamp L is preferably emitted parallel to a defined desired direction of incidence SA, which points from the lamp L in the direction of the 95% eye ellipse E. A normal vector N is drawn starting from the point of the side window SS at which the desired direction of incidence SA impinges on the side window SS. FIG. 2 shows that together with the desired direction of incidence SA, the normal vector N defines the plane of incidence PI.

By means of a polarization device P, the light of the lamp L is polarized or filtered such that the light is polarized essentially parallel to the plane of incidence.

Figure 3:
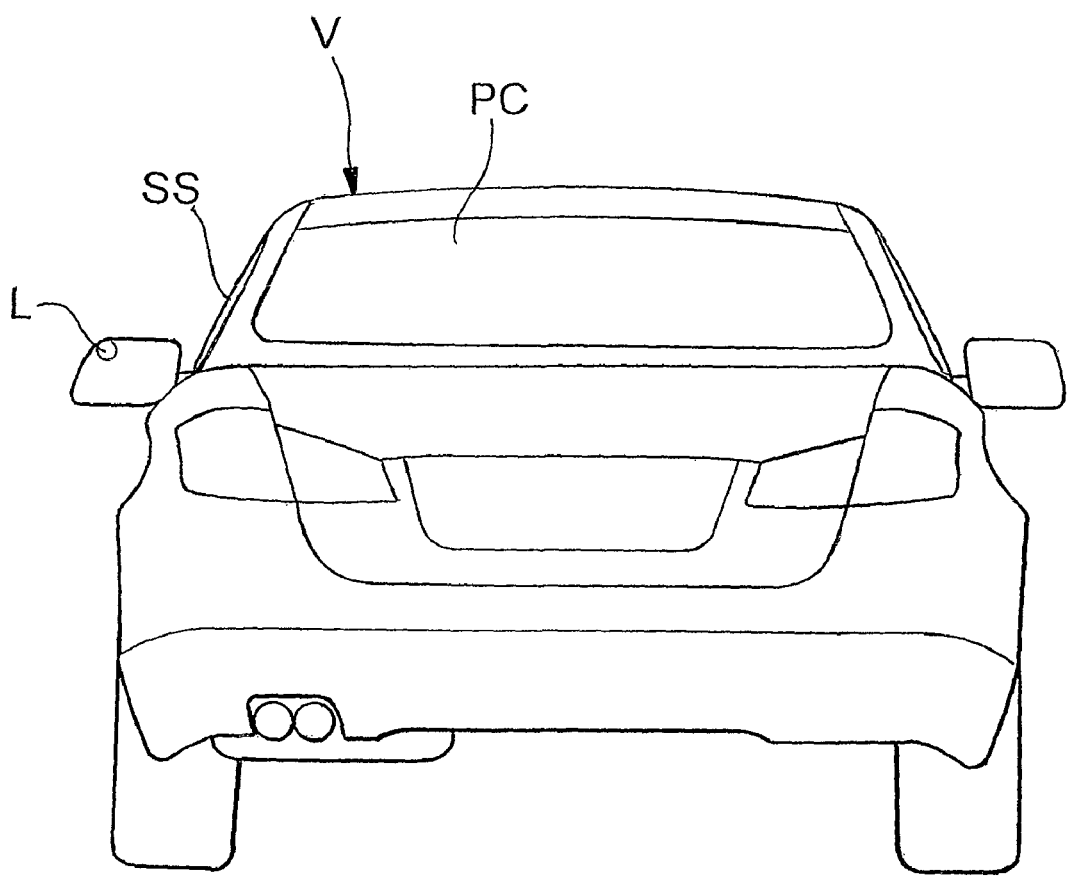
FIG. 3 is a schematic diagram of a motor vehicle including a passenger compartment according to an embodiment of the invention.

FIG. 3 illustrates a motor vehicle V, which includes a passenger compartment PC, a side window SS, and a lamp L.

For reasons of simplification, refraction effects, for example, at the side window, were neglected within the scope of this description but can easily be taken into account when this invention is implemented in practice.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
a passenger compartment including a vehicle window;
a lamp operatively configured outside of the passenger compartment, the lamp emitting light that passes through the vehicle window; and
wherein the lamp is operatively configured such that the light is one of polarized and made polarized parallel to a plane of incidence of the light.

2. The vehicle according to claim 1, further comprising a polarization device part of, or associated with, the lamp, the polarization device being operatively configured to polarize the light parallel to the plane of incidence of the light.

3. The vehicle according to claim 1, further comprising an exterior mirror, the lamp being operatively arranged on the exterior mirror.

4. The vehicle according to claim 2, further comprising an exterior mirror, wherein at least one of the lamp and the polarization device are operatively configured on the exterior mirror.

5. The vehicle according to claim 1, wherein the plane of incidence is defined by a normal vector of the vehicle window in a point of incidence of the light and the direction of incidence of the light.

6. The vehicle according to claim 2, wherein the plane of incidence is defined by a normal vector of the vehicle window in a point of incidence of the light and the direction of incidence of the light.

7. The vehicle according to claim 3, wherein the plane of incidence is defined by a normal vector of the vehicle window in a point of incidence of the light and the direction of incidence of the light.

8. The vehicle according to claim 5, wherein a desired direction of incidence of the light is defined, the plane of incidence being defined by the normal vector of the vehicle window in the point of intersection of the desired direction of incidence with the vehicle window and the desired direction of incidence of the light.

9. The vehicle according to claim 6, wherein a desired direction of incidence of the light is defined, the plane of incidence being defined by the normal vector of the vehicle window in the point of intersection of the desired direction of incidence with the vehicle window and the desired direction of incidence of the light.

10. The vehicle according to claim 7, wherein a desired direction of incidence of the light is defined, the plane of incidence being defined by the normal vector of the vehicle window in the point of intersection of the desired direction of incidence with the vehicle window and the desired direction of incidence of the light.

11. The vehicle according to claim 8, wherein the lamp is operatively configured to emit light parallel to the desired direction of incidence.

12. The vehicle according to claim 9, wherein the lamp is operatively configured to emit light parallel to the desired direction of incidence.

13. The vehicle according to claim 10, wherein the lamp is operatively configured to emit light parallel to the desired direction of incidence.

14. The vehicle according to claim 8, wherein the desired direction of incidence is aimed from the lamp in a direction of a 95% eye ellipse.

15. The vehicle according to claim 12, wherein the desired direction of incidence is aimed from the lamp in a direction of a 95% eye ellipse.

16. The vehicle according to claim 13, wherein the desired direction of incidence is aimed from the lamp in a direction of a 95% eye ellipse.

17. The vehicle according to claim 1, wherein the lamp is at least partially configured to emit a turn signal light.

18. The vehicle according to claim 1, wherein the lamp is operatively configured to signal an object or a danger in a vicinity of the vehicle.

19. The vehicle according to claim 17, wherein the lamp is operatively configured to signal an object or a danger in a vicinity of the vehicle.

* * * * *